(12) United States Patent
Tokuma

(10) Patent No.: US 11,496,640 B2
(45) Date of Patent: Nov. 8, 2022

(54) IMAGE FORMING APPARATUS

(71) Applicant: CANON KABUSHIKI KAISHA, Tokyo (JP)

(72) Inventor: Naoto Tokuma, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/209,339

(22) Filed: Mar. 23, 2021

(65) Prior Publication Data

US 2021/0306497 A1 Sep. 30, 2021

(30) Foreign Application Priority Data

Mar. 30, 2020 (JP) .............................. JP2020-059907

(51) Int. Cl.
*H04N 1/04* (2006.01)
*H04N 1/00* (2006.01)
*G03G 15/00* (2006.01)

(52) U.S. Cl.
CPC ..... *H04N 1/00748* (2013.01); *G03G 15/5025* (2013.01); *G03G 15/5054* (2013.01); *G03G 15/5062* (2013.01); *H04N 1/00713* (2013.01)

(58) Field of Classification Search
CPC ........... H04N 1/00748; H04N 1/00713; G03G 15/5025; G03G 15/5054; G03G 15/5062
USPC ....................................... 358/1.12, 488, 3.26
See application file for complete search history.

(56) References Cited

U.S. PATENT DOCUMENTS

| 9,551,966 | B2 | 1/2017 | Hirota et al. |
| 2020/0089150 | A1* | 3/2020 | Tokuma ................. B65H 29/14 |
| 2020/0218187 | A1* | 7/2020 | Takahashi .......... G03G 21/1647 |

FOREIGN PATENT DOCUMENTS

| JP | 2009-53346 A | | 3/2009 |
| JP | 2020019150 A | * | 2/2020 |

* cited by examiner

*Primary Examiner* — Cheukfan Lee
(74) *Attorney, Agent, or Firm* — Venable LLP

(57) ABSTRACT

An image forming apparatus includes an image forming unit to form an image onto a sheet based on an image forming condition, a conveyance roller to convey the sheet in a first conveyance path, a sheet discharger to discharge the sheet conveyed in the first conveyance path, and a sensor to read, in a second conveyance path branched from the first conveyance path, a test image formed on the sheet. In addition, a tray receives the sheet discharged via the second conveyance path, and a controller generates the image forming condition based on a reading result of the sensor. The controller executes first control of controlling the image forming unit to form a first test image and second control of controlling the image forming unit to form a second test image.

18 Claims, 11 Drawing Sheets

```
                              Header:
size:        270176 bytes              prim.platform:   'APPL'
CMMType:     'appl'                    flags: 0x00000000
version:     0x02002001                deviceManufacturer:  'EFI'
profileClass: 'prtr'                   deviceModel: 0
dataColorSpace: 'CMYK'                 deviceAttributes: 0x00000000, 0x00000000
interchangeSpace: 'XYZ'                renderingIntent: 2
CreationDate: 3.4.1996,  19:46:14      white XYZ: X = 0.9642, Y = 1.0000, Z = 0.8249
CS2Signature: 'acsp'
                    Tag Table:  <10 elements, double-click to inspect>
```

| Ind | Signet. | elementoffset      | size  |
|-----|---------|--------------------|-------|
| 0   | 'A2B0'  | 252 = 0x000000FC   | 43002 |
| 1   | 'B2A0'  | 43256 = 0x0000A8F8 | 42940 |
| 2   | 'A2B1'  | 86196 = 0x00015084 | 43002 |
| 3   | 'B2A1'  | 129200 = 0x0001F880| 42940 |
| 4   | 'A2B2'  | 172140 = 0x0002A06C| 43002 |
| 5   | 'B2A2'  | 215144 = 0x00034868| 42940 |
| 6   | 'gamt'  | 258084 = 0x0003F024| 11925 |
| 7   | 'desc'  | 270012 = 0x00041EBC| 125   |
| 8   | 'cprt'  | 270140 = 0x00041F3C| 14    |
| 9   | 'wtpt'  | 270156 = 0x00041F4C| 20    |

FIG. 5

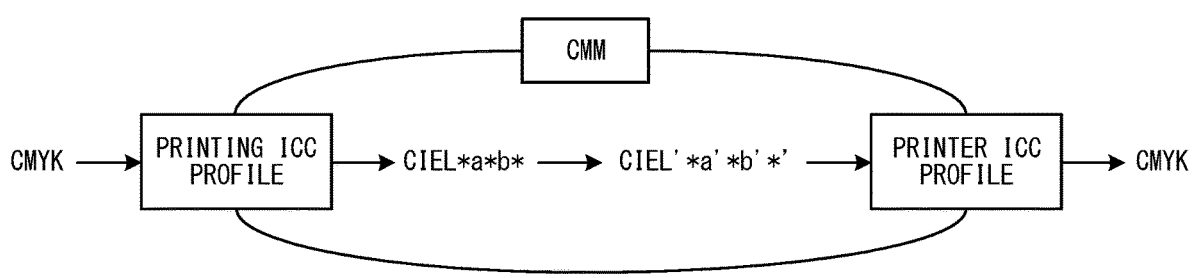

FIG. 6

|  | INITIAL CORRECTION | INTERRUPTION CORRECTION |
|---|---|---|
| NUMBER OF PATCH IMAGES REQUIRED FOR COLOR CORRECTION | LARGE (ABOUT 1,000) | SMALL (50 TO 80) |
| NUMBER OF PATCH IMAGES PER SHEET (ARRANGEMENT OF PATCH IMAGES IN SHEET) | LARGE (ENTIRE-RANGE ARRANGEMENT) | SMALL (TRAILING-EDGE-SIDE ARRANGEMENT) |
| LEADING EDGE POSITION OF SHEET AT STOP POSITION (CONVEYANCE DISTANCE FROM READING POSITION) | UPSTREAM (L1+Ls) | DOWNSTREAM (L1+Li) |
| TRAILING EDGE POSITION (WHETHER OR NOT CONVEYANCE OF NEXT SHEET IS ALLOWED) | THROUGH-PATH (NOT ALLOWED) | READING PATH (ALLOWED) |

FIG. 10

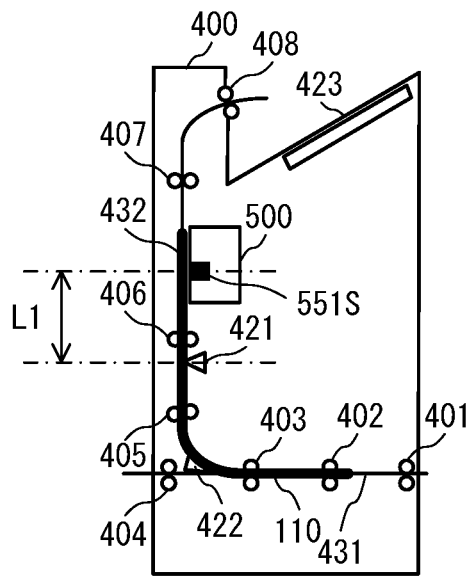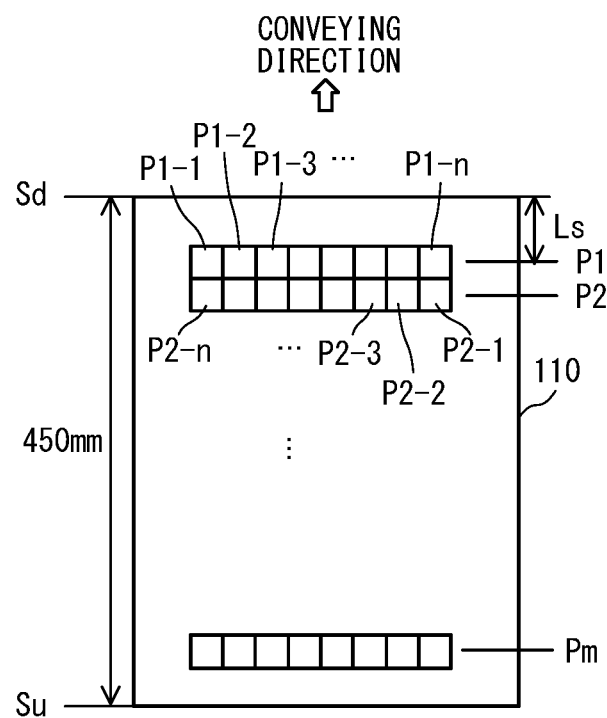
FIG. 11A
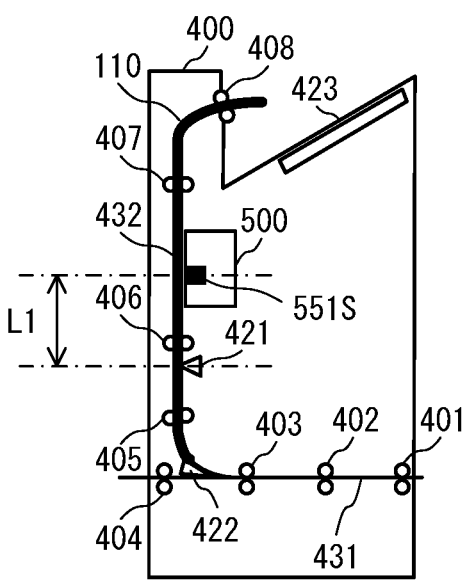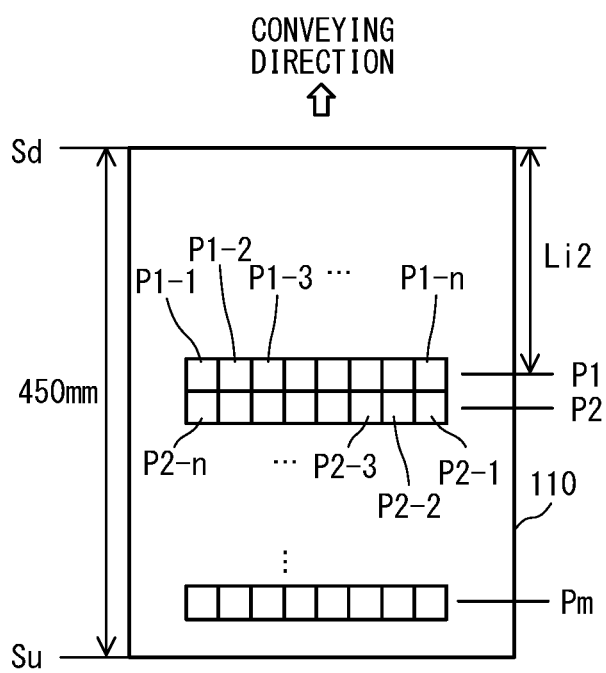
FIG. 11B

IMAGE FORMING APPARATUS

BACKGROUND OF THE INVENTION

Field of the Invention

The present disclosure relates to an image forming apparatus, for example, a copying machine, a multifunction peripheral, or a printer.

Description of the Related Art

In recent years, the market for on-demand image forming apparatus is expanding. For example, in an offset printing market, an electrophotographic image forming apparatus is becoming widespread. An image forming apparatus employing an inkjet system has succeeded in cultivating a wide market for reasons such as a large format, a low initial cost, and an extremely high speed. However, expansion of the market is not easy, and an image forming apparatus to newly enter the market must maintain quality of images (hereinafter referred to as "image quality") of the preceding image forming apparatus which has been available in the market. In order to maintain the image quality, an image forming condition to be used when the image forming apparatus forms an image onto a sheet is appropriately corrected.

The image quality includes a tone characteristic, granularity, in-plane evenness, letter quality, and color reproducibility (including color stability), for example. It is said that the most important of those is the color reproducibility. A human has memories of empirically expected colors (in particular, human skin, sky, and metal, for example), and feels uncomfortable about colors that deviate from this allowed range of memory. Such colors of memory are called "memory colors." Reproducibility of the memory colors is important when a picture or the like is printed. In addition, a group of office users who feel uncomfortable about a difference in color between a printed business document and a monitor, and a group of graphic arts users who deal with computer graphics have high demand for color reproducibility including stability of the on-demand image forming apparatus.

The color reproducibility also has a problem of color difference not only between apparatuses of the same model, but also between apparatuses of different models, between image forming apparatus employing different systems, or between an image forming apparatus and an image display apparatus, for example, a display. In order to perform color matching between those apparatus, software and a colorimeter for generating a multidimensional look-up table (LUT) called an international color consortium (ICC) profile are available. Professional users may generate an ICC profile of a printer and an ICC profile of an offset printing machine to construct a color management environment. As a result, the color to be output by the printer is allowed to be matched with the color to be printed by the offset printing machine, and hence the printer can be used for color calibration of the offset printing machine or for printing of a small number of copies.

The contents of the ICC profile of the offset printing machine and the ICC profile of the printer are calibrated in association with a color space independent of the printing machine or the printer, based on results of measuring colors of a test image through use of the colorimeter. The test image is formed of a combination of a plurality of patch images. The color space is, for example, a CIE L*a*b* color space (CIE stands for Commission Internationale d'Eclairage). In this manner, the color to be printed by the printing machine and the color to be printed by the printer are allowed to be matched with each other. A color management module (CMM) can generate print data by performing color conversion through use of those ICC profiles.

As described above, color management environments such as a colorimeter, applications, and profile generation software have become available. However, an offline colorimeter takes considerable time to measure colors. Further, the color management environments have issues in, for example, generation of the ICC profile, uploading the ICC profile to the printer or the like, and effective usage of the uploaded ICC profile, and are not popular to general users. In order to increase the speed of the color measurement, generate the ICC profile easily, and automate the setting work, there has been provided an image forming apparatus including an inline colorimeter installed in the vicinity of a sheet discharge portion of the printer.

In Japanese Patent Application Laid-open No. 2009-53346 and U.S. Pat. No. 9,551,966, there is disclosed an image forming apparatus configured to detect a test image formed on a sheet by a color sensor including a light source, a diffraction grating, and a position detection sensor. The color sensor has an inline color-meter configuration to improve the detection accuracy. The detection value obtained by the color sensor can be converted into a spectral reflectance, and further converted into coordinate information (L*, a*, b*) in the CIE L*a*b* color space in consideration of tristimulus values.

As an index of color matching accuracy and color stability, the average of ΔE is defined to be 4.0 in the color matching accuracy standard (IT8.7/4 (ISO 12642: 1,617 patches) [4.2.2]) according to ISO 12647-7. Further, the reproducibility [4.2.3], which is a standard of color stability, defines that ΔE of each patch image is equal to or smaller than 1.5. In order to satisfy such specifications, it is desired that the detection accuracy for ΔE of the color sensor be equal to or smaller than 1.0. The value of ΔE is expressed by the following expression of a three-dimensional distance between two points (L1, a1, b1) and (L2, a2, b2) in the L*a*b* color space defined by the CIE.

$$\Delta E = ((L1-L2)^2 + (a1-a2)^2 + (b1-b2)^2)^{1/2}$$

In an electrophotographic image forming apparatus, the hue varies when images are successively formed onto the sheets. In a case where the hue stability is checked while the images are successively formed, samples are regularly extracted to perform the hue check. That is, in order to obtain samples having stable hue successively from the beginning, it is general to perform a regular extraction check (interruption correction) in addition to pre-job color correction (initial correction). As the number of patch images required at the time of color correction, the number of patch images required for initial correction is generally larger than the number of patch images required for interruption correction. The initial correction requires about 1,000 patch images, while the regular interruption correction defined in Japan Standard Color Bar or ISO 12647-7 Control Wedge requires about 50 to 80 patch images.

However, in a configuration which requires time to read a test image formed on a sheet, the productivity may be reduced. For example, as illustrated in FIG. 13A, in a case where a sensor 700 is arranged on a conveyance path 731 through which the sheet is to be conveyed, conveyance of a sheet S2 is required to be stopped until measurement of a sheet S1 is finished. This is to prevent the subsequent sheet S2 from colliding with the trailing edge of the sheet S1 being measured.

Further, as illustrated in FIG. 13B, also in a configuration having a branch to a second conveyance path 732 for a sensor in the middle of the first conveyance path 731 for conveying the sheet to another apparatus connected to the downstream of the apparatus, the trailing edge of the sheet S1 remains in the first conveyance path 731. For example, in a case in which the sheet to which the test image is formed has a measurement region extending to a sheet leading edge, in a case where the sheet S1 is intended to be stopped at a reading position of the sensor 700, the measurement is required to be started before the trailing edge of the sheet S1 enters the second conveyance path 732. The sheet S1 is required to be stopped for a longer time particularly when the measurement requires time. In this case, the subsequent sheet S2 may collide with the stopped sheet S1 to cause jamming.

In order to avoid the collision with the subsequent sheet as described above, as illustrated in FIG. 13C, there is conceivably a configuration in which the sensor 700 is arranged in the second conveyance path 732. In this configuration, in order to prevent the first sheet S1 and the subsequent sheet S2 from colliding with each other, the measurement of the sheet S1 is started after the trailing edge of the sheet S1 is conveyed to the second conveyance path 732. In this case, the measurement region on the sheet S1 is reduced, and the number of patch images that can be read from one sheet is reduced. As a result, the required number of sheets is increased. In view of the above, in the present disclosure, the sheet is stopped at a stop position suitable for control of reading a test image.

SUMMARY OF THE INVENTION

An image forming apparatus according to the present disclosure includes: an image forming unit configured to form an image onto a sheet based on an image forming condition; a conveyance roller configured to convey the sheet in a first conveyance path; a sheet discharger configured to discharge the sheet conveyed in the first conveyance path; a sensor configured to read, in a second conveyance path branched from the first conveyance path, a test image formed on the sheet; a tray on which the sheet is discharged via the second conveyance path; a controller configured to: generate the image forming condition based on a reading result of the sensor; execute first control of controlling the image forming unit to form a first test image, controlling the conveyance roller to stop the sheet having the first test image formed thereon at a first stop position, and starting reading of the first test image by the sensor; and execute second control of controlling the image forming unit to form a second test image, controlling the conveyance roller to stop the sheet having the second test image formed thereon at a second stop position, and starting reading of the second test image by the sensor, wherein the first control is executed before the image forming unit forms an image based on a job, wherein the second control is executed while the image forming unit successively forms images onto a plurality of sheets based on the job, wherein, when the first test image is formed on a predetermined size of sheet, a trailing edge of the predetermined size of sheet stopped at the first stop position is located upstream of a position in which the second conveyance path is branched from the first conveyance path, and wherein, when the second test image is formed on the predetermined size of sheet, the trailing edge of the predetermined size of sheet stopped at the second stop position located downstream of the position in which the second conveyance path is branched from the first conveyance path.

Further features of the present invention will become apparent from the following description of exemplary embodiments (with reference to the attached drawings).

BRIEF DESCRIPTION OF THE DRAWINGS

FIG. 5 is an explanatory view of an ICC profile.

FIG. 6 is an explanatory view of color management.

FIG. 10 is a table of a summary of conditions at the time of color correction.

FIG. 11A and FIG. 11B are explanatory views of a position of a sheet in the automatic reading apparatus.

DESCRIPTION OF THE EMBODIMENTS

Now, a description is given of an embodiment of the present disclosure with reference to the drawings.

<Image Forming Apparatus>

Figure 1:
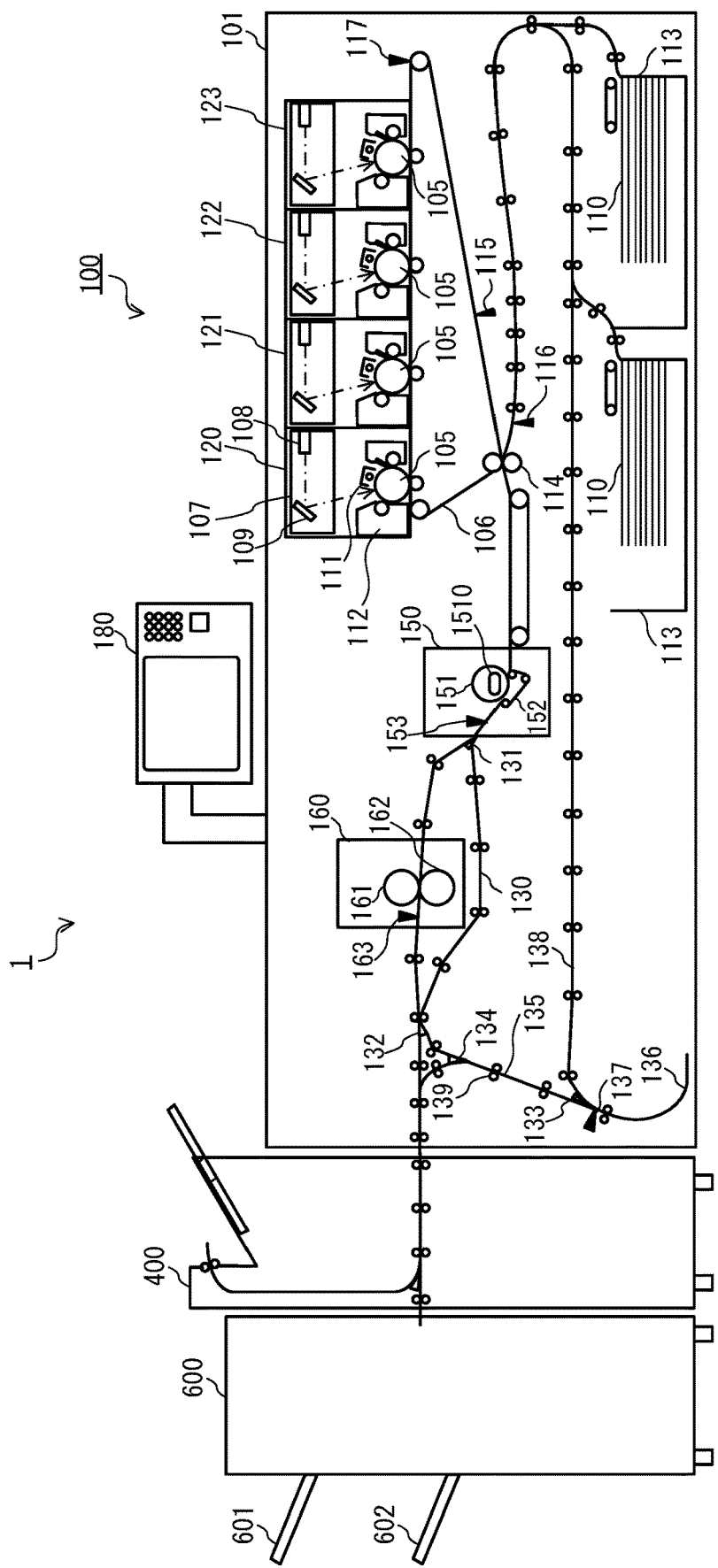
FIG. 1 is a configuration view of an image forming apparatus according to an embodiment of the present disclosure.

FIG. 1 is a configuration view of an image forming apparatus according to this embodiment. An image forming apparatus 1 according to this embodiment includes a printer 100, an automatic reading apparatus 400, and a sheet discharge apparatus 600. The printer 100 employs an electrophotographic system to form an image onto a sheet 110. The printer in this embodiment may be an inkjet printer or a dye-sublimation printer.

The printer 100 includes, inside a casing 101, mechanisms which form an engine unit for use in image formation, and a controller to be described later. The controller is configured to control the operations of the mechanisms. An operation panel 180 is provided in an upper portion of the casing 101. The operation panel 180 is a user interface, and includes an input device configured to receive instructions from a user, and an output device configured to display a screen such as an operation screen. The mechanisms which form the engine unit include a mechanism (image forming mechanism) configured to form an image, a mechanism (transfer mechanism) configured to transfer the image onto the sheet 110, a mechanism (feeding mechanism) configured to feed the sheet 110, and a mechanism (fixing mechanism) configured to fix the image to the sheet 110.

The image forming mechanism includes four image forming units 120, 121, 122, and 123 corresponding respective colors of yellow (Y), magenta (M), cyan (C), and black (K). The image forming units 120, 121, 122, and 123 are configured to form images of corresponding colors. The image forming units 120, 121, 122, and 123 have the same configuration, but differ only in color of the image to be formed. A description is given here of the configuration of the image forming unit 120, and description of the configurations of the other image forming units 121, 122, and 123 is omitted.

The image forming unit 120 includes a photosensitive drum 105, a charging device 111, a laser scanner 107, and a developing device 112. The photosensitive drum 105 is a drum-shaped photosensitive member, and is configured to rotate about a drum shaft. The charging device 111 is configured to uniformly charge the surface of the rotating photosensitive drum 105. The laser scanner 107 is configured to scan the photosensitive drum 105 with laser light modulated based on image data representing the image to be formed. The laser scanner 107 includes a light emitting portion 108 configured to scan the laser light emitted from a semiconductor laser in one direction, and a reflective mirror 109 configured to reflect the laser light emitted from the light emitting portion 108 toward the photosensitive drum 105. A direction in which the laser scanner 107 scans the photosensitive drum 105 (depth direction of FIG. 1) corresponds to a main scanning direction.

When the charged photosensitive drum 105 is scanned with the laser light, an electrostatic latent image corresponding to the image data is formed on its surface. The developing device 112 is configured to develop the electrostatic latent image formed on the photosensitive drum 105 with developer. In this manner, a visible image of the electrostatic latent image is formed on the surface of the photosensitive drum 105. On the photosensitive drum 105 of the image forming unit 120, a yellow image is formed. On the photosensitive drum 105 of the image forming unit 121, a magenta image is formed. On the photosensitive drum 105 of the image forming unit 122, a cyan image is formed. On the photosensitive drum 105 of the image forming unit 123, a black image is formed. The photosensitive drum 105 and the developing device 112 are removable from the casing 101.

The transfer mechanism includes an intermediate transfer member 106 and transfer rollers 114. Onto the intermediate transfer member 106, images are sequentially transferred in superimposition from the photosensitive drums 105 of the respective image forming units 120, 121, 122, and 123. In this embodiment, the intermediate transfer member 106 is configured to rotate in the clockwise direction of FIG. 1, and images are transferred in order of the image forming unit 120 (yellow), the image forming unit 121 (magenta), the image forming unit 122 (cyan), and the image forming unit 123 (black). An image density detection sensor 117 is provided on the downstream of the image forming unit 123 in the rotating direction of the intermediate transfer member 106. The image density detection sensor 117 is configured to detect an image density from an image for image density detection formed on the intermediate transfer member 106.

The images transferred onto the intermediate transfer member 106 are conveyed to reach the transfer rollers 114 as the intermediate transfer member 106 is rotated. An image formation starting position detection sensor 115 is provided on the upstream of the transfer rollers 114 in the rotating direction of the intermediate transfer member 106. The image formation starting position detection sensor 115 is used to determine a transfer position for transfer onto the sheet 110. The transfer rollers 114 are configured to bring the sheet 110 into pressure-contact with the intermediate transfer member 106, and are to be applied with a bias having an opposite characteristic to that of an image formed on the intermediate transfer member 106. Thus, the images are transferred onto the sheet 110 from the intermediate transfer member 106.

The feeding mechanism includes a sheet feeding cassette 113 configured to store the sheet 110, a conveyance path through which the sheet 110 is to be fed, and various rollers for conveying the sheet 110 through the conveyance path. The sheet 110 is fed from the sheet feeding cassette 113, conveyed through the conveyance path so that the images are transferred and fixed to be formed thereon, and is discharged to the outside of the casing 101.

Accordingly, the sheet 110 is first fed from the sheet feeding cassette 113, and is then conveyed through the conveyance path to reach the transfer rollers 114. A sheet feeding timing sensor 116 is provided in the middle of the conveyance path from the sheet feeding cassette 113 to the transfer rollers 114. The sheet feeding timing sensor 116 is used to adjust the timing to convey the sheet 110. The timing to convey the sheet 110 to the transfer rollers 114 is adjusted based on the timing at which the image formation starting position detection sensor 115 detects the images formed on the intermediate transfer member 106 and the timing at which the sheet feeding timing sensor 116 detects the sheet 110. In this manner, the images are transferred onto a predetermined position of the sheet 110 from the intermediate transfer member 106.

The sheet 110 having the images transferred thereon is conveyed to the fixing mechanism. The fixing mechanism in this embodiment includes a first fixing device 150 and a second fixing device 160. The first fixing device 150 includes a fixing roller 151, a pressure belt 152, and a post-fixing sensor 153. The fixing roller 151 is configured to heat the sheet 110 in order to thermally pressure-fix the images onto the sheet 110. The pressure belt 152 is used to bring the sheet 110 to pressure contact with the fixing roller 151. The post-fixing sensor 153 is configured to detect that the fixing is finished. The fixing roller 151 is a hollow roller, and includes therein a heater 1510. The fixing roller 151 is configured to rotate to convey the sheet 110. The post-fixing sensor 153 is configured to detect the sheet 110 subjected to image fixing.

The second fixing device 160 is arranged on the downstream with respect to the first fixing device 150 in the conveying direction of the sheet 110. The second fixing device 160 is used to add gloss to the image formed on the sheet 110 subjected to fixing processing by the first fixing device 150 or to ensure the fixing performance. The second fixing device 160 includes a fixing roller 161, a pressure roller 162, and a post-fixing sensor 163. The fixing roller 161 has a configuration similar to that of the fixing roller 151, and functions similarly to the fixing roller 151. The pressure roller 162 functions similarly to the pressure belt 152. The post-fixing sensor 163 functions similarly to the post-fixing sensor 153. The second fixing device 160 performs fixing processing to the sheet 110 similarly to the first fixing device 150.

The second fixing device 160 may not be used depending on the type of the sheet 110 and the content of the image formation processing. A conveyance path 130 is provided in order to convey the sheet 110 subjected to fixing processing by the first fixing device 150 without causing the sheet 110 to pass through the second fixing device 160. Accordingly, a flapper 131 is provided on the downstream of the first fixing device 150 in the conveying direction of the sheet 110. The flapper 131 is used to guide the sheet 110 to any one of the second fixing device 160 and the conveyance path 130.

The sheet 110 that has passed through any one of the second fixing device 160 and the conveyance path 130 is discharged as it is in some cases, and is conveyed to a conveyance path 135 in other cases. Accordingly, a flapper 132 is provided at a position after a junction between a conveyance path following the second fixing device 160 and the conveyance path 130. The flapper 132 is used to guide the sheet 110 to any one of the conveyance path 135 and a discharge path of the sheet 110. The sheet 110 guided to the discharge path is discharged to the outside of the casing 101 with its surface having the image formed thereon facing upward.

The conveyance path 135 is a path for conveying the sheet 110 to a reverse path 136 to be used for reversing the front and back surfaces of the sheet 110. A reverse sensor 137 configured to detect the sheet 110 is provided in the reverse path 136. in a case where the reverse sensor 137 detects the trailing edge of the sheet 110, the conveying direction of the sheet 110 is reversed in the reverse path 136. The sheet 110 whose conveying direction is reversed is conveyed to any one of the conveyance path 135 and a reverse path 138. Accordingly, a flapper 133 is provided at a branch of the conveyance path 135 and the reverse path 138. In a case where being conveyed to the conveyance path 135, the sheet 110 is guided by the flapper 133 to the conveyance path 135, and is discharged to the outside of the casing 101 with its front and back surfaces being reversed (surface having the image formed thereon facing downward). When being conveyed to the reverse path 138, the sheet 110 is guided by the flapper 133 to the reverse path 138. The sheet 110 guided to the reverse path 138 is conveyed to the transfer rollers 114 again with its front and back surfaces being reversed. In this manner, image formation is performed on the back surface of the sheet 110.

<Automatic Reading Apparatus>

Figure 2:
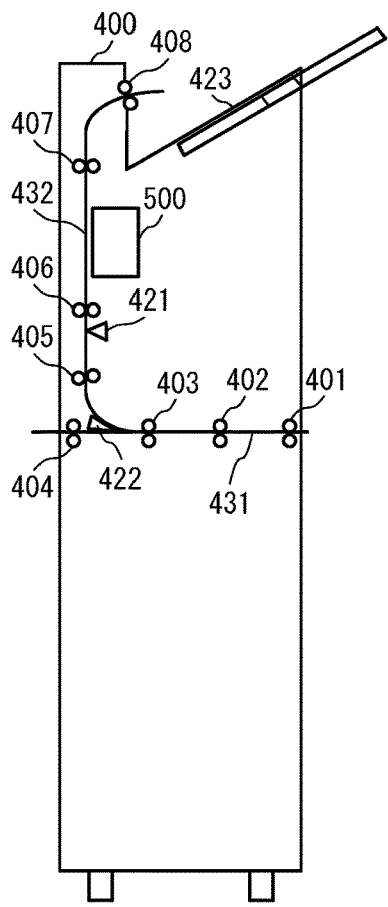
FIG. 2 is a configuration view of an automatic reading apparatus.

FIG. 2 is a configuration view of the automatic reading apparatus 400. The automatic reading apparatus 400 is provided at the subsequent stage of the printer 100, and is configured to receive the sheet 110 subjected to image formation and discharged from the printer 100. The automatic reading apparatus 400 includes two conveyance paths of a through-path 431 and an upper path (reading path 432).

In the through-path 431, conveyance rollers 401, 402, and 403 and discharge rollers 404 are provided. In the reading path 432, conveyance rollers 405, 406, and 407 and discharge rollers 408 are provided. In the reading path 432, a sheet sensor (a sheet detector) 421 is arranged between the conveyance rollers 405 and the conveyance rollers 406, and a color measurement unit 500 is arranged between the conveyance rollers 406 and the conveyance rollers 407. The sheet 110 transmitted from the printer 100 is conveyed by the conveyance rollers 401, 402, and 403 to a branch position between the through-path 431 and the reading path 432. The sheet 110 is conveyed to any one of the through-path 431 and the reading path 432 at the branch position. Accordingly, the automatic reading apparatus 400 includes a flapper 422 for guiding the sheet 110 conveyed along the through-path 431 to the reading path 432. The flapper 422 switches a conveyance destination of the sheet 110.

In a case where the sheet 110 is to be directly conveyed through the through-path 431, the sheet 110 is guided by the flapper 422 to the discharge roller 404 side, and is discharged to the outside of the automatic reading apparatus 400 (to the sheet discharge apparatus 600). The sheet discharge apparatus 600 is configured to discharge the sheet 110 to a tray 601 or a tray 602. The sheet discharge apparatus 600 may be a post-processing apparatus configured to perform post-processing, such as staple processing and book-binding processing, to the sheets 110.

In a case where the sheet 110 is to be conveyed to the reading path 432, the sheet 110 is guided by the flapper 422 to the reading path 432. The sheet 110 guided to the reading path 432 has its test image read by the color measurement unit 500, and is then discharged to a discharge tray 423 by the discharge rollers 408. The color measurement unit 500 is an inline sensor configured to read an image from the sheet 110 conveyed through the reading path 432.

<Color Measurement Unit>

Figure 3:
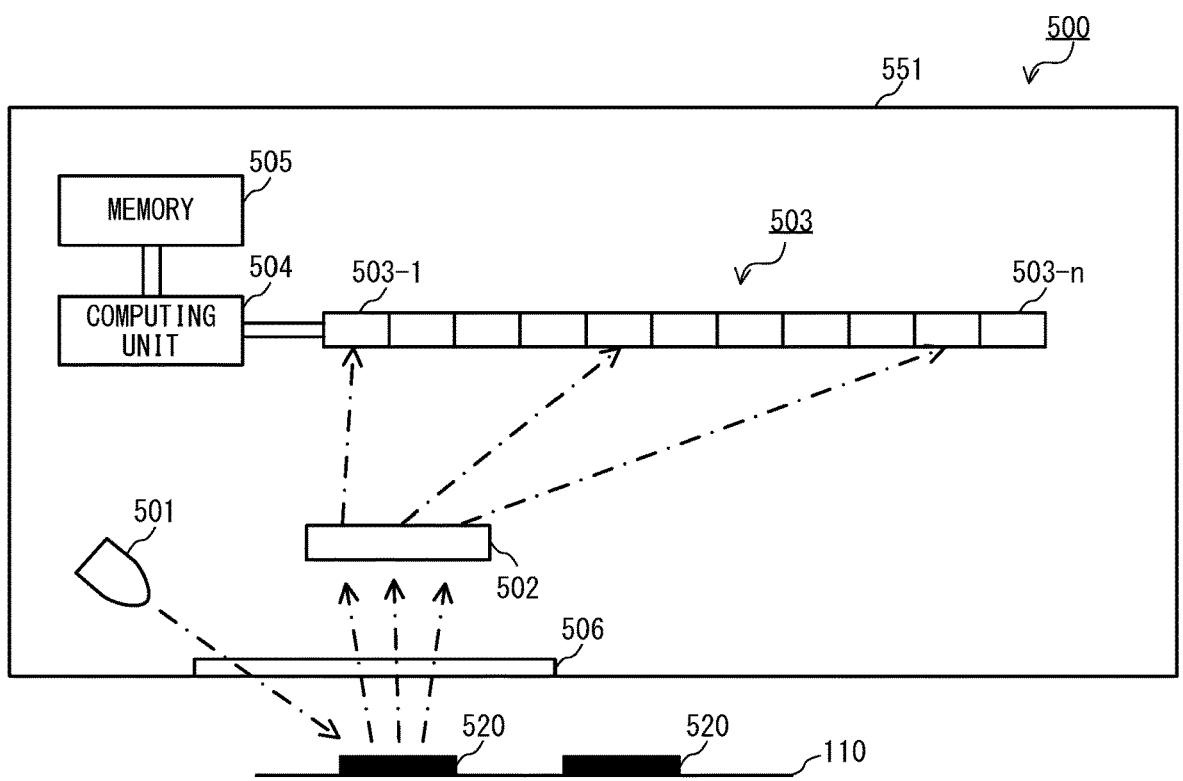
FIG. 3 is an explanatory configuration view of a color measurement unit.

FIG. 3 is an explanatory configuration view of the color measurement unit 500. The color measurement unit 500 includes a color detection sensor 551. The color detection sensor 551 is a color sensor configured to perform color measurement of detecting a spectral reflectance of a test image 520 formed on the sheet 110. The color detection sensor 551 includes a white light emitting diode (LED) 501, a diffraction grating 502, a line sensor 503, a computing unit 504, a memory 505, and a lens 506.

The white LED 501 is a light emitting portion, and is configured to radiate light to the sheet 110 conveyed through the reading path 432. The diffraction grating 502 is configured to spectrally disperse the light reflected by the test image 520 by wavelength. The lens 506 is configured to condense the light radiated from the white LED 501 to the test image 520, and also condense the light reflected by the test image 520 to the diffraction grating 502.

The line sensor 503 is a light receiving portion including light receiving elements 503-1 to 503-$n$ corresponding to "n" pixels. Each of the light receiving elements 503-1 to 503-$n$ of the line sensor 503 is configured to receive the reflected light spectrally dispersed by wavelength by the diffraction grating 502. Each of the light receiving elements 503-1 to 503-$n$ is configured to output, as a detection result, a voltage (electrical signal) having a correlation with, for example, an intensity of the received reflected light. The computing unit 504 is configured to convert the value of the voltage output from each of the light receiving elements 503-1 to 503-$n$ into an 8-bit digital signal (light intensity value). The correspondence between each of the light receiving elements 503-1 to 503-$n$ and the wavelength is determined in advance. Accordingly, the light intensity value of each of the light receiving elements 503-1 to 503-$n$ corresponds to a reflected-light intensity (spectral data) of each wavelength. The memory 505 has stored therein a light intensity of each wavelength obtained when each of the light receiving elements 503-1 to 503-$n$ receives light reflected from a reference member (not shown).

The computing unit 504 is configured to divide a reflected-light intensity $P(\lambda)$ of each wavelength corresponding to the test image 520 by a light intensity $W(\lambda)$ of each wavelength corresponding to the reference member, to thereby calculate a spectral reflectance $R(\lambda)$ of the test image 520. The spectral reflectance $R(\lambda)$ of the test image 520 is stored in the memory 505, and is also output to a Lab computing unit 303 (FIG. 4) of the printer 100 from the automatic reading apparatus 400.

<Controller>

Figure 4:
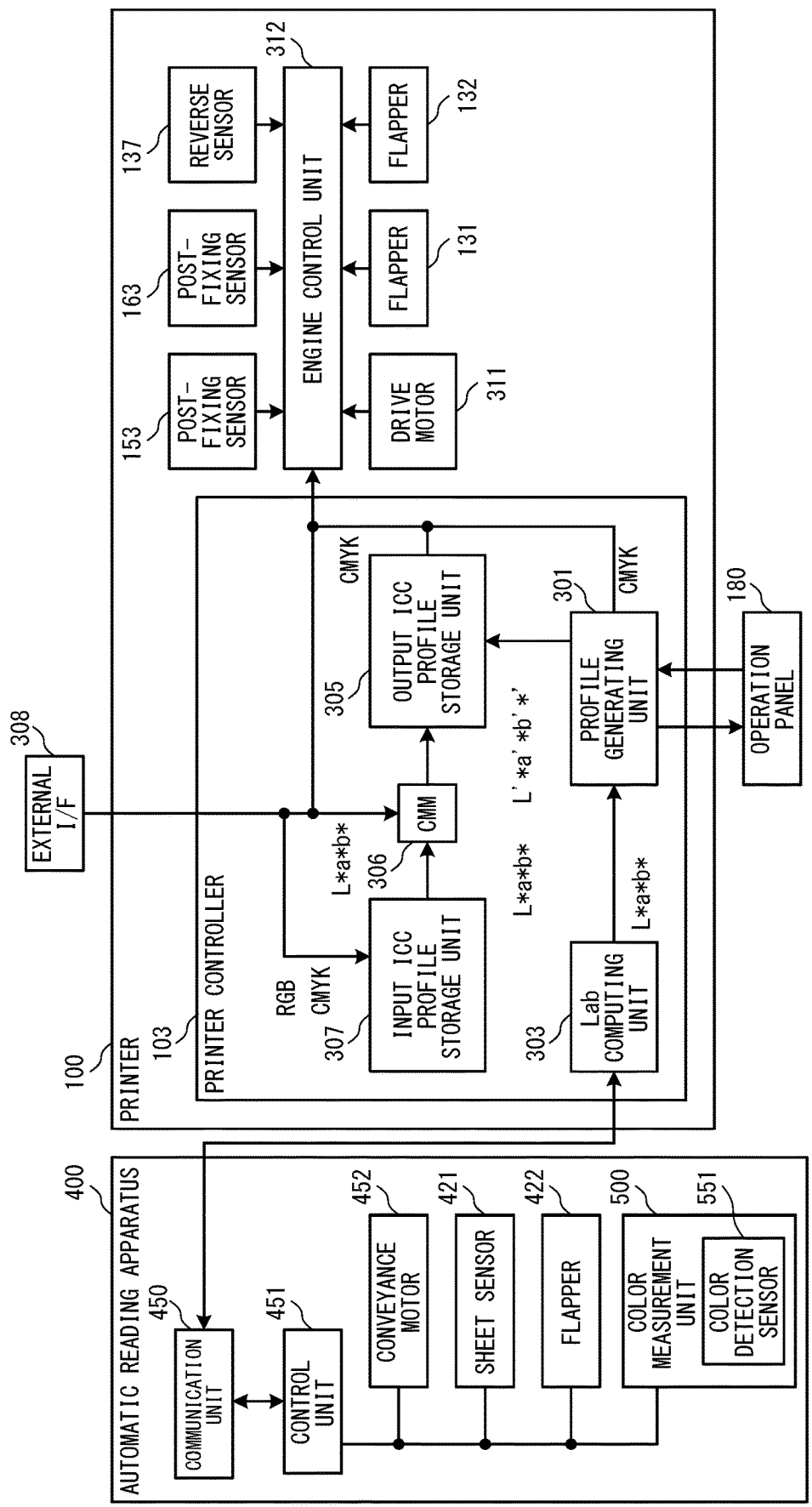
FIG. 4 is an explanatory diagram of a controller.

FIG. 4 is an explanatory diagram of a controller configured to control the operation of the image forming apparatus 1 configured as described above. The printer 100 includes, as the controller, a printer controller 103 and an engine control unit 312. The printer controller 103 is configured to control the operation of the printer 100. The engine control unit 312 is configured to control the operation of the engine unit for use in image formation. The automatic reading apparatus 400 includes a control unit 451 and a communication unit 450. The control unit 451 is configured to control the operation of the automatic reading apparatus 400. The communication unit 450 is configured to perform communication to/from the printer controller 103.

The engine control unit 312 is connected to the post-fixing sensors 153 and 163, the reverse sensor 137, a drive motor 311, and the flappers 131 and 132. The drive motor 311 is configured to drive the rollers for conveying the sheet 110. The engine control unit 312 is configured to control the drive motor 311 and the flappers 131 and 132 based on the detection results obtained by the respective sensors, to thereby control the engine unit to convey the sheet 110. Further, although not shown, the engine control unit 312 is configured to control the operations of the image forming mechanism, the transfer mechanism, the feeding mechanism, and the fixing mechanism to perform image formation onto the sheet 110. The operation of the engine control unit 312 is controlled by the printer controller 103.

The printer controller 103 is connected to the operation panel 180 and an external I/F 308. The external I/F 308 is a communication interface for performing communication to/from an external apparatus via a predetermined network. The printer controller 103 can receive a job or the like from the external apparatus via the external I/F 308. Details of the operation of the printer controller 103 are described later.

The control unit 451 of the automatic reading apparatus 400 is connected to a conveyance motor 452, the sheet sensor 421, the flapper 422, and the color measurement unit 500 (color detection sensor 551). The control unit 451 is formed of at least one processor configured to control the conveyance motor 452, the sheet sensor 421, the flapper 422, and the color measurement unit 500 (color detection sensor 551). The control unit 451 is configured to communicate to/from the printer controller 103 via the communication unit 450, to thereby perform processing in cooperation with the printer controller 103. The control unit 451 is configured to control, through use of the conveyance motor 452, the operations of the conveyance rollers 401, 402, and 403, the discharge rollers 404, the conveyance rollers 405, 406, and 407, and the discharge rollers 408 in the automatic reading apparatus 400, to thereby convey the sheet 110. The control unit 451 is configured to control the operation of the flapper 422. The control unit 451 is configured to control the operation of the color measurement unit 500 (color detection sensor 551) in accordance with the timing at which the sheet sensor 421 detects the sheet 110, to thereby detect the test image 520 formed on the sheet 110.

<Basic Adjustment Processing>

The image forming apparatus 1 according to this embodiment forms the test image 520 for maintaining the image quality onto the sheet 110 by the printer 100. The test image 520 includes a combination of a plurality of patch images. The printer 100 conveys the sheet 110 having the test image 520 formed thereon to the automatic reading apparatus 400. The automatic reading apparatus 400 reads the test image 520 formed on the sheet 110 by the color measurement unit 500 (color detection sensor 551). The printer controller 103 performs feedback control based on the detection result (reading result) obtained by the color detection sensor 551, to thereby maintain the image quality, for example, color reproducibility.

The image forming apparatus 1 according to this embodiment generates a profile, and performs image formation through use of the generated profile. As a profile for achieving excellent color reproducibility, in this embodiment, an ICC profile is used. As the profile, for example, a color rendering dictionary (CRD), a color separation table, CMYK simulation in ColorWise can also be used.

The automatic reading apparatus 400 measures the spectral reflectance of the test image 520 by the color detection sensor 551. The image forming apparatus 1 generates an ICC profile as a color conversion profile based on the spectral reflectance of the test image 520 output from the automatic reading apparatus 400. A CMM 306 (FIG. 4) of the image forming apparatus 1 performs color conversion processing through use of the generated ICC profile so that the color of the image to be formed based on the image data becomes a target color.

A calculation expression for L*, a*, and b* is described. The color detection sensor 551 spectrally disperses light radiated from the white LED 501 and reflected by a measurement target by the diffraction grating 502, and detects the dispersed light by the light receiving elements 503-1 to 503-$n$ arranged in respective wavelength regions of from 380 nm to 720 nm. In this embodiment, in order to improve the detection computation accuracy, the Lab computing unit 303 (FIG. 4) converts the spectral reflectance into coordinate information (L*, a*, b*) in a CIE L*a*b* color space through use of color matching functions as defined by the CIE. The ICC profile being the color conversion profile is generated based on a relationship between the data of L*, a*, and b* and a signal value (image data) of the test image 520.

<L*a*b* Computation>

The following refers to a method of calculating the coordinate information (L*, a*, b*) in the CIE L*a*b* color space from the spectral reflectance (defined in ISO 13655).

a. The spectral reflectance R($\lambda$) of the sample is obtained (from 380 nm to 780 nm).

b. Color matching functions x($\lambda$), y($\lambda$), and z($\lambda$) and a standard light spectral distribution SD50($\lambda$) are prepared.

The color matching functions are defined by JIS Z8701. SD50($\lambda$) is defined by JIS Z8720, and is also called an auxiliary standard illuminant D50.

c. R($\lambda$)×SD50($\lambda$)×x($\lambda$), R($\lambda$)×SD50($\lambda$)×y($\lambda$), R($\lambda$)×SD50($\lambda$)×z($\lambda$)

d. Integration of each wavelength is performed.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. The product of the color matching function y($\lambda$) and the standard light spectral distribution SD50($\lambda$) is integrated with respect to each wavelength.

$$\Sigma\{SD50(\lambda) \times y(\lambda)\}$$

f. X, Y, and Z are calculated.

$$X = 100 \times \Sigma\{SD50(\lambda) \times y(\lambda)\} / \Sigma\{R(\lambda) \times SD50(\lambda) \times x(\lambda)\}$$

$$Y = 100 \times \Sigma\{SD50(\lambda) \times y(\lambda)\} / \Sigma\{R(\lambda) \times SD50(\lambda) \times y(\lambda)\}$$

$$Z = 100 \times \Sigma\{SD50(\lambda) \times y(\lambda)\} / \Sigma\{R(\lambda) \times SD50(\lambda) \times z(\lambda)\}$$

g. L*, a*, and b* are calculated.

$$L^* = 116 \times (Y/Yn)^{(1/3)} - 16$$

$$a^* = 500\{(X/Xn)^{(1/3)} - (Y/Yn)^{(1/3)}\}$$

$$b^* = 200\{(Y/Yn)^{(1/3)} - (Z/Zn)^{(1/3)}\}$$

provided that Y/Yn>0.008856

When Y/Yn>0.008856 is satisfied, Xn, Yn, and Zn are tristimulus values of standard light.

$$(X/Xn)\wedge(1/3)=7.78(X/Xn)\wedge(1/3)+16/116$$

$$(Y/Yn)\wedge(1/3)=7.78(Y/Yn)\wedge(1/3)+16/116$$

$$(Z/Zn)\wedge(1/3)=7.78(Z/Zn)\wedge(1/3)+16/116$$

<Profile Generation>

In a case where a component is replaced by a customer engineer, before a job for which color matching accuracy is required is output, or in a case where a user desires to know the hue of a final output product at a design planning stage or the like, the user operates the operation panel 180 to give an instruction to perform profile generation processing. The printer controller 103 generates a profile in accordance with the instruction from the operation panel 180.

As illustrated in FIG. 4, the printer controller 103 includes a profile generating unit 301, the Lab computing unit 303, an output ICC profile storage unit 305, the CMM 306, and an input ICC profile storage unit 307.

A profile generation instruction is input from the operation panel 180 to the profile generating unit 301. The profile generating unit 301 transmits, in accordance with the instruction, a signal to the engine control unit 312 so as to form CMYK (cyan, magenta, yellow, and black) color signals (test image) of an ISO 12642 test form without using a profile. At the same time, the printer controller 103 transmits a color measurement instruction to the color detection sensor 551. The engine control unit 312 controls the operation of the printer 100 to print the ISO 12642 test form (test image) onto the sheet 110. With respect to the sheet 110 having the test form (test image) printed thereon, the patch images included in the test image are measured by the color detection sensor 551. The spectral reflectance of the measured patch images is input to the printer controller 103. The spectral reflectance is converted into data of L*, a*, and b* by the Lab computing unit 303, and the data is input to the profile generating unit 301. The spectral reflectance may be converted into coordinate information (X, Y, Z) in a CIE 1931XYZ colorimetric system, which is an apparatus-independent color space, and is different from the CIE L*a*b* color space.

The profile generating unit 301 generates an output ICC profile based on the relationship between the CMYK color signals of the test form and the input data of L*, a*, and b*. The profile generating unit 301 exchanges the output ICC profile already stored in the output ICC profile storage unit 305 for the generated output ICC profile.

The ISO 12642 test form (test image) includes patch images of CMYK color signals covering a color reproducible range that can be output by general copying machines. The profile generating unit 301 generates a color conversion table based on the relationship between each color signal value and the measured data of L*, a*, and b*. That is, a conversion table (A2Bx tag) from CMYK to data of L*, a*, and b* is generated. An inverse conversion table (B2Ax tag) is generated based on this conversion table.

FIG. 5 is an explanatory view of the ICC profile. The ICC profile includes a header, tags, and data. In addition to the color conversion table, for example, the tags describe even a tag (gamt) representing whether a given color expressed by a white point (Wtpt) or a Lab value defined in the profile falls inside or outside the reproducible range of the hard copy.

The printer controller 103 may receive the profile generation instruction from the external apparatus via the external I/F 308. In this case, the printer controller 103 acquires an output ICC profile generated by the external apparatus, and performs color conversion by an application corresponding to the ICC profile.

<Color Conversion Processing>

In color conversion in general color image formation, image data input via the external I/F 308, assuming to be RGB signal values or standard printing CMYK signal values of Japan Color or the like, is stored in the input ICC profile storage unit 307 for external input. In this case, the external I/F 308 is connected to a scanner or the like as the external apparatus. The image data stored in the input ICC profile storage unit 307 is subjected to conversion of from RGB to L*a*b* or from CMYK to L*a*b*. The image data stored in the input ICC profile storage unit 307 is converted into device-independent data of L*, a*, and b* from the device-dependent color space.

The image data converted into the data of L*, a*, and b* is input to the CMM 306. FIG. 6 is an explanatory view of color management performed by the CMM 306. The CMM 306 performs GUMAT conversion of mapping a mismatch between a reading color space of the scanner or the like serving as the external apparatus and an output color reproducible range of the printer 100 serving as an output apparatus. Further, the CMM 306 performs color conversion of adjusting a mismatch (also called a color temperature setting mismatch) between a light source type in input and a light source type in observing an output product. The CMM 306 further performs black letter determination or the like. In this manner, the data of L*, a*, and b* is converted into data of L*', a*', and b*' to be stored in the output ICC profile storage unit 305. As described above, the generated profile is stored in the output ICC profile storage unit 305. Color conversion is performed based on the newly generated ICC profile to convert the data into CMYK signals dependent on the output apparatus. The CMYK signals are thus output.

<Operation During Color Measurement>

FIG. 7A to FIG. 7D are explanatory views of processing (color measurement) of reading the test image by the color measurement unit 500. Onto the sheet 110, a plurality of patch images are formed as a test image. The test image includes a predetermined number of patch images in each of a row direction and a column direction. In this embodiment, patch images P for color measurement of "m" rows of from P1 to Pm are formed onto the sheet 110 in the row direction. In the column direction of each row, "n" patch images of P1-1, P1-2, P1-3, . . . , and P1-n are formed. That is, one sheet 110 has m×n patch images arranged thereon. The numbers "m" and "n" may be different numbers, or may be the same number.

The color detection sensor 551 of the color measurement unit 500 is movable by a moving mechanism (not shown) in a direction (main scanning direction) orthogonal to the conveying direction of the sheet 110. The position of the color detection sensor 551 is detected by a moving position detection sensor (not shown). The conveyance of the sheet 110 is controlled by the conveyance rollers 405, 406, and 407 and a conveyance mechanism (not shown). The position of the sheet 110 is detected by a sheet position detection sensor (not shown).

Figure 7A:
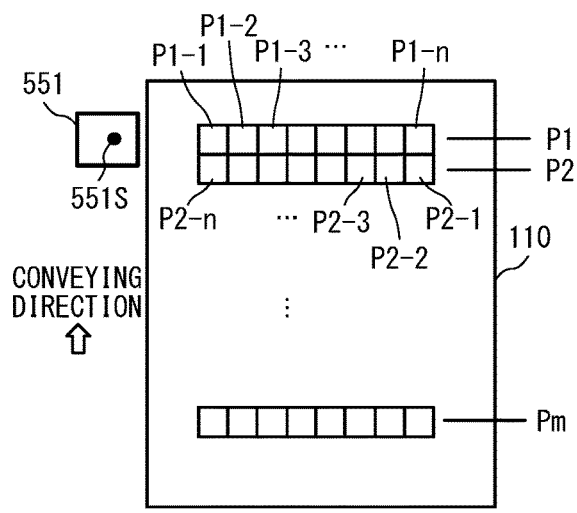
FIG. 7A, FIG. 7B, FIG. 7C, and FIG. 7D are explanatory views of processing (color measurement) of reading a test image.
Figure 7B:
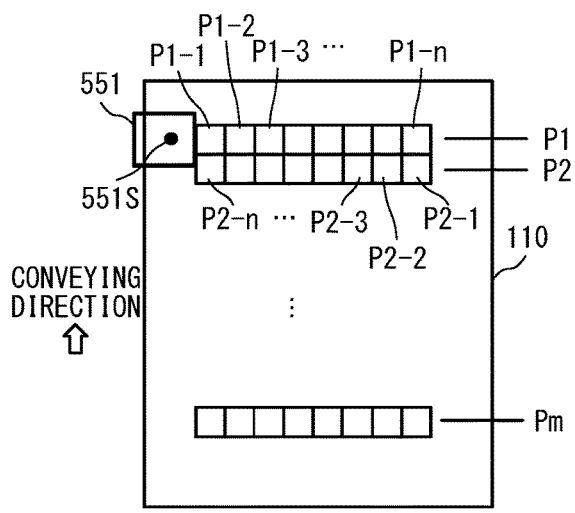
Figure 7C:
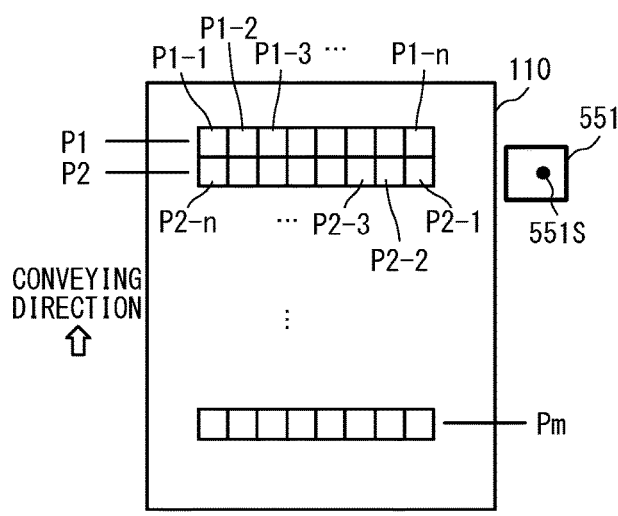
Figure 7D:
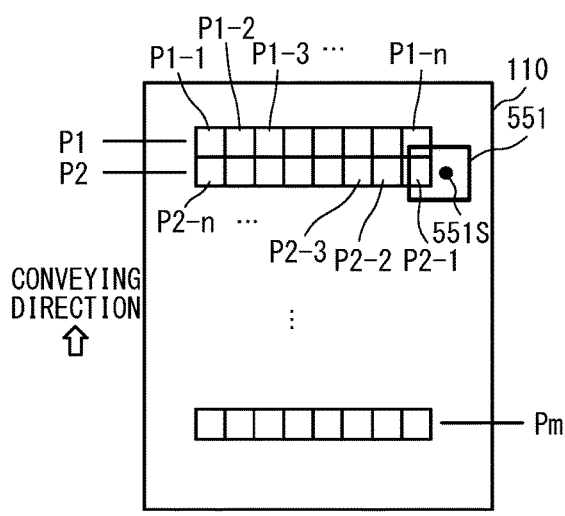

In a case where the sheet 110 is conveyed to the reading position of the color detection sensor 551, as illustrated in FIG. 7A, the color detection sensor 551 is retracted to and stands by at the outside of the region of the sheet 110 in the main scanning direction. The sheet 110 is conveyed until the patch images P1 in the first row reach a reading position 551S. In a case where the patch images P1 reach the reading position 551S, the conveyance of the sheet 110 is stopped. After that, the color detection sensor 551 reads the "n" patch images P1-1 to P1-n while moving in the main scanning direction as illustrated in FIG. 7B. The color detection sensor 551 which has read the patch images P1-1 to P1-n is moved to outside the region of the sheet 110 in the main scanning direction as illustrated in FIG. 7C. The movement of the color detection sensor 551 is stopped after the color detection sensor 551 reaches outside of the region of the sheet 110. The color detection sensor 551 stands by at the outside of the region of the sheet 110. Under this state, the sheet 110 is conveyed until the patch images P2 reach the reading position 551S. In a case where the patch images P2 reach the reading position 551S, the conveyance of the sheet 110 is stopped. After that, the color detection sensor 551 reads the "n" patch images P2-1 to P2-n while moving in the main scanning direction as illustrated in FIG. 7D. The color detection sensor 551 reads all of the m×n patch images P formed on the sheet 110 while moving and reciprocating m/2 times in the main scanning direction. As described above, the color detection sensor 551 reads the patch images P while moving and reciprocating in the main scanning direction.

<Image Formation, Initial Correction, and Interruption Correction>

Figure 8A:
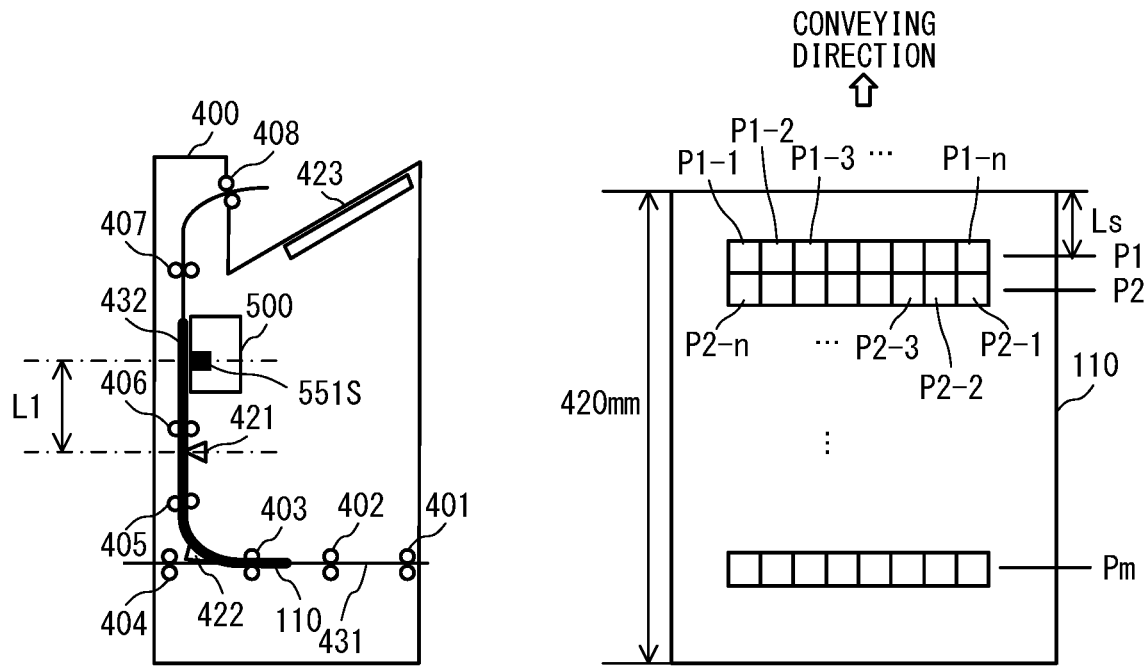
FIG. 8A and FIG. 8B are explanatory views of a position of a sheet in the automatic reading apparatus.
Figure 8B:
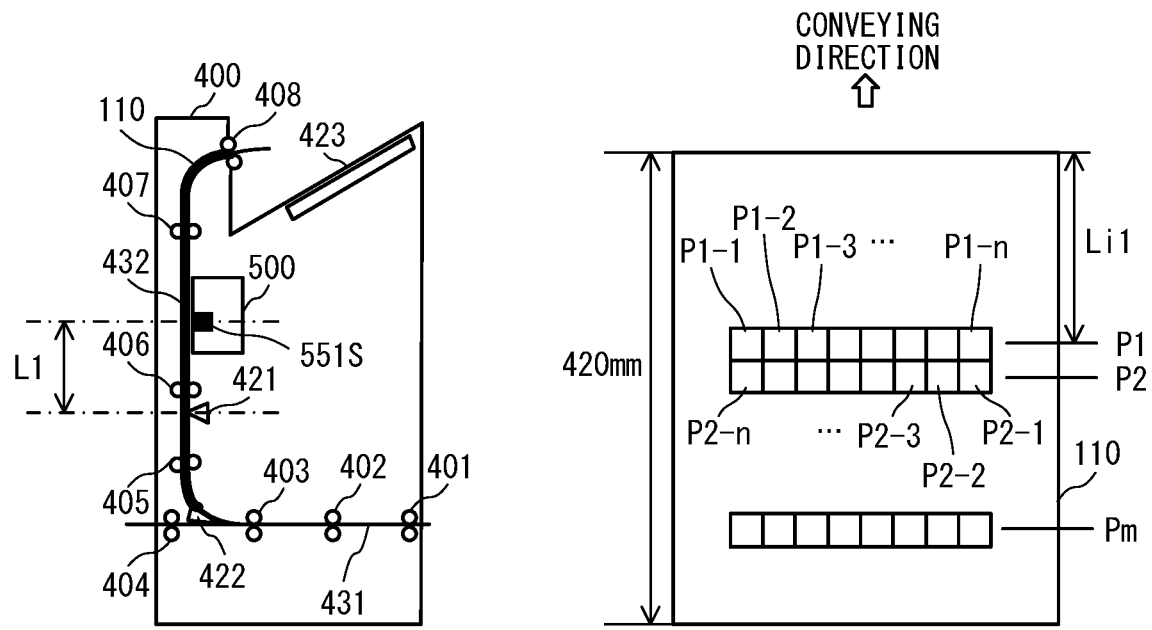
Figure 9:
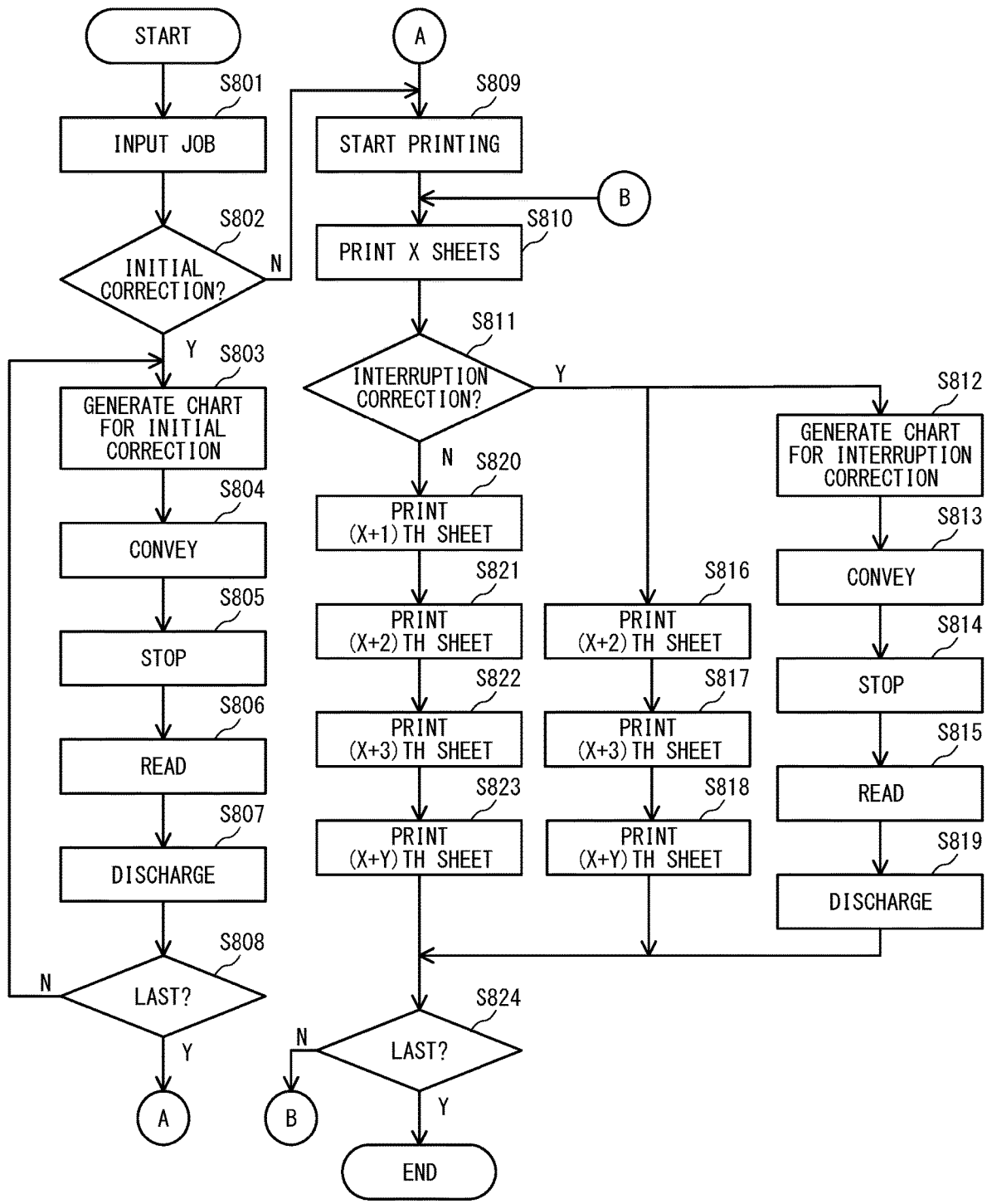
FIG. 9 is a flow chart for illustrating image formation processing including color correction.

FIG. 8A and FIG. 8B are explanatory views of the position of the sheet 110 in the automatic reading apparatus 400 when the test image is read. FIG. 9 is a flow chart for illustrating image formation processing including color correction performed by the image forming apparatus 1. The color correction includes initial correction to be performed before the image formation processing and interruption correction to be performed in the middle of the image formation processing. In this case, a description is given of the processing of a case in which the sheet 110 has an A3 size. The A3 size sheet 110 has a length in the conveying direction of 420 mm, and a length in the direction orthogonal to the conveying direction of 297 mm.

In a case where a job is input by a user through the operation panel 180, the printer controller 103 checks whether or not to perform the initial color correction (Step S801, Step S802). In a case where the initial color correction is to be performed (Step S802: Y), the printer controller 103 controls the engine control unit 312 to print a chart for initial correction onto the sheet 110 (Step S803). The sheet 110 having the chart for initial correction printed thereon is conveyed to the automatic reading apparatus 400. The sheet 110 is conveyed through the through-path 431 by the conveyance rollers 401, 402, and 403 to reach the flapper 422. The flapper 422 guides the sheet 110 to the reading path 432 side.

In a case where the sheet sensor 421 detects the sheet 110, the printer controller 103 controls the control unit 451 to convey the sheet 110 until the patch images P1 in the first row reach the reading position 551S (Step S804). In a case where the sheet 110 reaches the target position, the printer controller 103 controls the control unit 451 to stop the conveyance of the sheet 110 (Step S805). FIG. 8A shows a state in which the patch images P1 of the sheet 110 are conveyed to the same position in the conveying direction as the reading position 551S of the color detection sensor 551. The conveyance rollers 401, 402, and 403 are driven by the conveyance motor 452 to convey the sheet 110. The conveyance motor 452 is, for example, a pulse motor. The control unit 451 counts the number of pulses of the conveyance motor 452 from the timing at which the sheet sensor 421 detects the leading edge of the sheet 110, and stops the rotation of the conveyance motor 452 in a case where the count number reaches a first value. In this manner, the sheet 110 can be stopped at a first stop position at which the patch images in the first row of the chart for initial correction reach the reading position 551S. Further, when the conveying speed of the sheet 110 is previously determined, the conveyance motor 452 is stopped at a timing at which a first time period has elapsed from the timing at which the sheet sensor 421 detected the sheet 110, thereby being capable of stopping the sheet 110 at the first stop position.

As illustrated in FIG. 8A, a distance from the detecting position of the sheet sensor 421 to the same position in the conveying direction as the reading position 551S is represented by L1, and a distance from the leading edge of the sheet 110 to a center portion in the conveying direction of the patch images P1 in the first row is represented by Ls. The sheet 110 is stopped at a position conveyed by "(L1+Ls)" from when the leading edge thereof is detected by the sheet sensor 421. At this time, the trailing edge of the sheet 110 remains in the through-path 431.

After that, the printer controller 103 controls the control unit 451 to control the color measurement unit 500, to thereby read all of the patch images P formed on the sheet 110 (Step S806). In the processing of Step S806, the printer controller 103 controls the conveyance motor 452 so as to convey the sheet 110 by a predetermined amount every time the color measurement unit 500 finishes reading one row of patch images. After the reading of the patch images P formed on the sheet 110 is finished, the control unit 451 discharges the sheet 110 to the discharge tray 423 (Step S807). The printer controller 103 repeatedly executes the processing of from Step S803 to Step S807 until the sheet 110 is the last sheet of the chart for initial correction (Step S808: N). The initial color correction requires about 1,000 patch images. Accordingly, about five or six, or about ten sheets 110 are required even when the A3 size sheet 110 is used.

After the initial color correction is finished (Step S808: Y), the printer controller 103 starts to form an image onto the sheet 110 based on the job (Step S809). In a case where the initial color correction is not performed (Step S802: N), the printer controller 103 advances the processing to Step S809 without performing the processing of from Step S803 to Step S808. In this manner, in a case where the initial color correction is not performed, the image forming apparatus 1 starts to form an image onto the sheet 110 based on the job.

When images are to be formed on a plurality of sheets 110 based on the job, the printer controller 103 performs the image formation onto X sheets 110 set in advance, and then determines whether or not to perform the interruption correction (Step S810, Step S811). It is preferred to adopt a mode in which the number X of sheets can be freely set by the user. This is because an allowable value with respect to hue variations is different depending on each user. A user who desires to suppress the hue variations to be minimum sets a small number as the number X of sheets to control the interruption correction to be performed at a high frequency. A user who can accept variations to some extent controls the interruption correction to be performed at a low frequency.

In a case where the interruption correction is not performed (Step S811: N), the printer controller 103 forms images based on the job onto an (X+1)th sheet 110 and the subsequent sheets. Then, the printer controller 103 determines whether or not the images are formed onto all of the sheets based on the job (Step S824). In a case where the image formation onto all of the sheets based on the job is not finished (Step S824: N), the printer controller 103 advances the processing to Step S810. Further, in a case where the image formation onto all of the sheets based on the job is finished (Step S824: Y), the printer controller 103 ends the processing.

Further, in a case where the interruption correction is to be performed (Step S811: Y), the printer controller 103 prints a chart for interruption correction onto the (X+1)th sheet 110 (Step S812). That is, onto the (X+1)th sheet 110, the chart for interruption correction is printed instead of forming an image based on the job. The test image (patch images) of the chart for interruption correction printed in Step S812 is different from the test image (patch images) of the chart for initial correction. The sheet 110 having the chart for interruption correction printed thereon is conveyed to the automatic reading apparatus 400. The sheet 110 is conveyed through the through-path 431 by the conveyance rollers 401, 402, and 403 to reach the flapper 422. The flapper 422 guides the sheet 110 to the reading path 432 side.

In a case where the sheet sensor 421 detects the sheet 110, the printer controller 103 controls the control unit 451 to convey the sheet 110 to reach a position at which the trailing edge thereof enters the reading path 432, and to stop the sheet 110 at the position (Step S813, Step S814). FIG. 8B shows a state in which the trailing edge of the sheet 110 is conveyed to reach the reading path 432. The conveyance rollers 401, 402, and 403 are driven by the conveyance motor 452 to convey the sheet 110. The conveyance motor 452 is, for example, a pulse motor. The control unit 451 counts the number of pulses of the conveyance motor 452 from the timing at which the sheet sensor 421 detects the leading edge of the sheet 110, and stops the rotation of the conveyance motor 452 in a case where the count number reaches a second value. In this manner, the sheet 110 can be stopped at a second stop position at which the patch images in the first row of the chart for interruption correction reach the reading position 551S. The second value is larger than the first value. Further, in a case where the conveying speed of the sheet 110 is previously determined, the conveyance motor 452 is stopped at a timing at which a second time period has elapsed from the timing at which the sheet sensor 421 detected the sheet 110, thereby being capable of stopping the sheet 110 at the second stop position. The second time period is longer than the first time period.

When the distance from the detecting position of the sheet sensor 421 to the reading position 551S is represented by L1, and a distance from the leading edge of the sheet 110 to a center portion in the conveying direction of the patch images P1 in the first row is represented by Li1, the position of the leading edge of the sheet 110 at the second stop position is distant by "(L1+Li1)" from the detecting position of the sheet sensor 421. The distance Li1 from the leading edge of the sheet 110 to the patch images in the first row for the chart for interruption correction is set to be longer than the distance Ls from the leading edge of the sheet 110 to the patch images in the first row for the chart for initial correction. Accordingly, the number of patch images per sheet of the chart for interruption correction is smaller than the number of patch images per sheet of the chart for initial correction. However, as described above, the correction can be sufficiently performed even when the number of patch images of the chart for interruption correction is smaller than the number of patch images of the chart for initial correction.

The printer controller 103 controls the control unit 451 to read all of the patch images P of the chart for interruption correction by the color measurement unit 500 (Step S815). After the reading is finished, the control unit 451 discharges the sheet 110 to the discharge tray 423 (Step S819).

As illustrated in FIG. 8B, at the second stop position at the time of the interruption correction, the trailing edge of the sheet 110 is retracted from the through-path 431. Accordingly, there is obtained a state in which conveyance of the next sheet 110 to the through-path 431 is allowed. In view of this, when the chart for interruption correction is formed onto the (X+1)th sheet 110 in the middle of the image formation based on the job, the printer controller 103 forms an image based on the job onto the (X+2)th sheet before the reading of the chart for interruption correction is started. After the image formation, the (X+2)th sheet passes through the through-path 431 to be discharged to the downstream sheet discharge apparatus 600. Subsequently, the printer controller 103 forms images corresponding to the job onto the (X+3)th sheet, the (X+4)th sheet, . . . , and the (X+Y)th sheet (Step S816, Step S817, Step S818). The printer controller 103 advances the processing to Step S824 immediately after the chart for interruption correction is formed onto the sheet 110.

As described above, at the time of the interruption correction, the sheet 110 having the chart for interruption correction printed thereon is stopped at the second stop position so as to prevent the trailing edge of the sheet 110 from remaining in the through-path 431. Accordingly, while the test image of the chart for interruption correction is read, printing processing corresponding to the job is allowed. The number of sheets passing through the through-path 431 while the test image of the chart for interruption correction is read depends on a time period required for reading the test image and a printing productivity. For example, in the image forming apparatus 1 configured to print 50 sheets of A3 size every minute, when the time period required for reading the test image by the color measurement unit 500 is 30 seconds, printing of 25 sheets is allowed while the test image is read. Accordingly, reduction in productivity is suppressed even when the interruption correction is performed.

FIG. 10 is a table for showing a summary of conditions at the time of color correction in this embodiment. This table includes the number of patch images, the arrangement of the patch images, the leading edge position of the sheet at the stop position, and the trailing edge position of the stopped sheet, at the time of the initial correction and at the time of the interruption correction.

As described above, at the time of the initial correction, the number of patch images is larger, and also the number of patch images per sheet is larger. The position of the leading edge of the sheet 110 stopped at the first stop position is located on the upstream with respect to the position of the leading edge of the sheet 110 stopped at the second stop position. Accordingly, the number of patch images per sheet of the chart for initial correction is also larger than the number of patch images per sheet of the chart for interruption correction. The trailing edge position of the stopped sheet remains in the through-path 431 at the time of the initial correction, but reaches the reading path 432 at the time of the interruption correction. Accordingly, the next sheet can be conveyed through the through-path 431 at the time of the interruption correction. With such a setting, the initial correction can be performed accurately, and printed matters having stable hue can be successively provided due to the interruption correction during the job. Further, the reduction in productivity due to the stop of printing during the interruption correction can be suppressed.

In Case of A3+(SRA3) Size Sheet

Description has been given above of the processing in the case of the A3 size sheet. Subsequently, a description is given of the processing in a case of a so-called plus size sheet. FIG. 11A and FIG. 11B are explanatory views of the position of the sheet 110 in the automatic reading apparatus 400 when an SRA3 size sheet longer than the A3 size sheet is used. The type of the SRA3 size sheet is different from the type of the A3 size sheet.

At the time of the initial correction, the sheet 110 is stopped at a distance of "(L1+Ls)" from the detecting position of the sheet sensor 421 so that the leading edge position is the same as that in the case of A3. That is, a leading edge Sd of the sheet 110 is stopped at the same position between the case of A3 and the case of SRA3, and a trailing edge Su of the sheet 110 is on the upstream in the case of SRA3 as compared to the case of A3.

At the time of the interruption correction, the sheet 110 is stopped at a distance of "(L1+Li2)" from the detecting position of the sheet sensor 421 so that the trailing edge position is the same as that in the case of A3. That is, a trailing edge Su of the sheet 110 is stopped at the same position between the case of A3 and the case of SRA3, and a leading edge Sd of the sheet 110 is on the downstream in the case of SRA3 as compared to the case of A3.

The number of patch images required for the interruption correction is the same, and hence the difference in length between Li2 in the case of SRA3 and Li1 in the case of A3 corresponds to a difference in length of the sheet (=30 mm). As described above, when the sheets have different lengths in the conveying direction, at the time of the initial correction, the leading edge positions are aligned when the conveyance of the sheet 110 is stopped (leading edge reference), and at the time of the interruption correction, the trailing edge positions are aligned when the conveyance of the sheet 110 is stopped (trailing edge reference). The reference positions are provided, such as the leading edge reference for the initial correction and the trailing edge reference for the interruption correction. In this manner, the conveyance control and the chart can be simplified.

In Case of A4 Size Sheet

Figure 12:
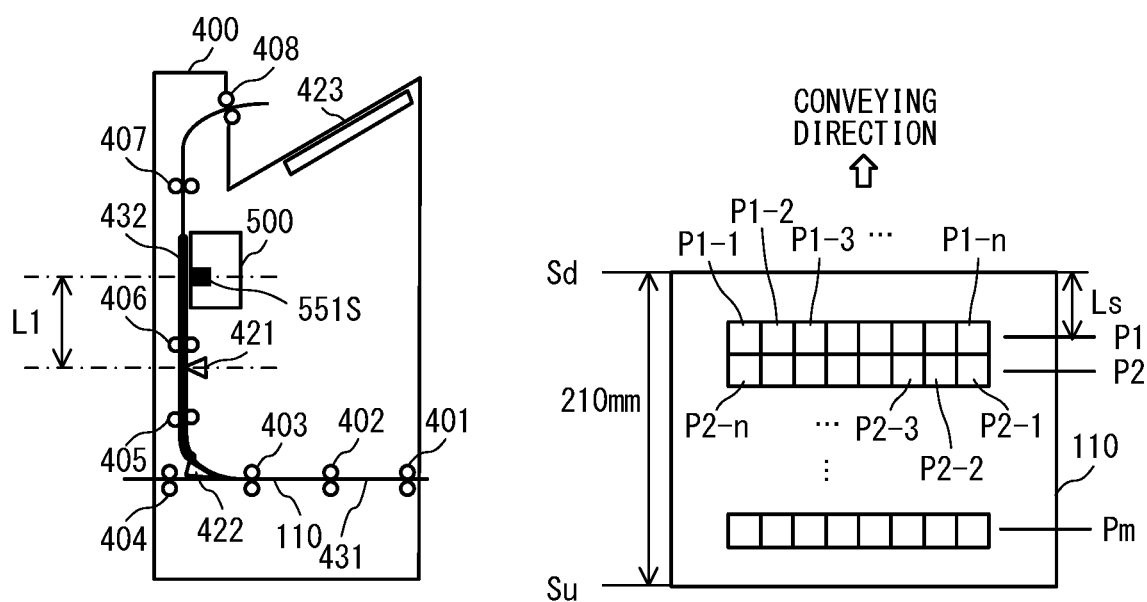
FIG. 12 is an explanatory view of a position of a sheet in the automatic reading apparatus.
Figure 13A:
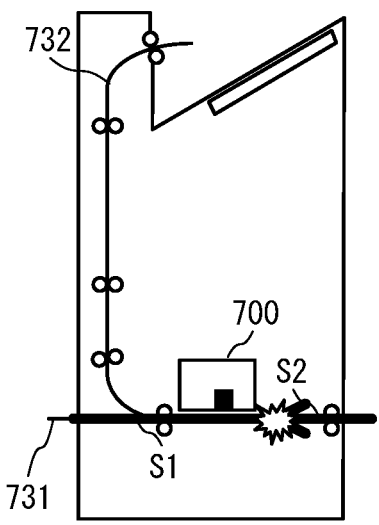
FIG. 13A, FIG. 13B, and FIG. 13C are explanatory views of a problem to be controlled in a case where a color sensor is moved in a main scanning direction.
Figure 13B:
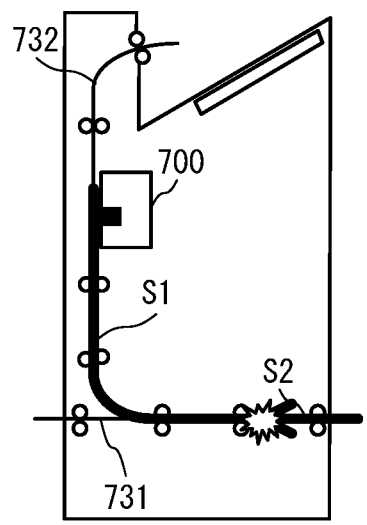
Figure 13C:
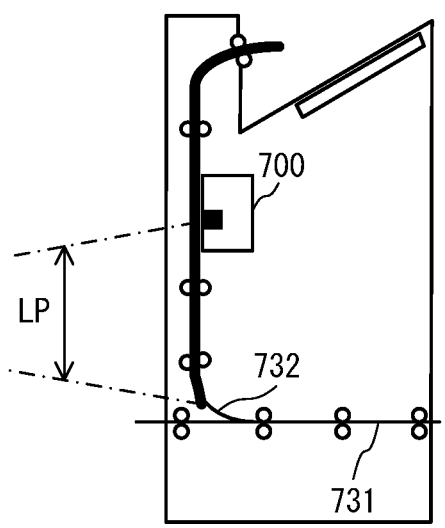

FIG. 12 is an explanatory view of the position of the sheet 110 in the automatic reading apparatus 400 when an A4 size sheet is used. The A4 size sheet is shorter in length in the conveying direction than the A3 size sheet. The type of the A4 size sheet is different from the type of the A3 size sheet. In a case in which the trailing edge of the sheet 110 does not remain in the through-path 431 even when the leading edge of the sheet 110 is stopped at the stop position (position of "(L1+Ls)" from the sheet sensor 421) at the time of the initial correction, the sheet 110 may be stopped at the same stop position in both of the initial correction and the interruption correction. That is, when the distance from the flapper 422 to the reading position 551S is increased, sheets of all sizes can be controlled to be stopped at the same position.

As described above, when the length of the sheet 110 in the conveying direction is equal to or longer than a predetermined length, at the time of the initial correction, the conveyance of the sheet 110 is stopped at a position at which the trailing edge of the sheet 110 in the conveying direction remains in the through-path 431, and the reading of the test image by the color measurement unit 500 is started. At the time of the interruption correction, the conveyance of the sheet 110 is stopped at a position at which the trailing edge of the sheet 110 in the conveying direction does not remain in the through-path 431, and the reading of the test image by the color measurement unit 500 is started.

When the length of the sheet 110 in the conveying direction is shorter than the predetermined length, at the time of the initial correction and at time of the interruption correction, the conveyance of the sheet 110 is stopped at a position at which the trailing edge of the sheet 110 in the conveying direction does not remain in the through-path 431, and the reading of the test image by the color measurement unit 500 is started.

The predetermined length is determined based on a distance from a branch point between the through-path 431 and the reading path 432 to the reading position 551S of the color detection sensor 551. When the length of the sheet 110 in the conveying direction is equal to or larger than the distance from the branch point between the through-path 431 and the reading path 432 to the reading position 551S of the color detection sensor 551, the length of the sheet 110 in the conveying direction is equal to or longer than the predetermined length. When the length of the sheet 110 in the conveying direction is shorter than the distance from the branch point between the through-path 431 and the reading path 432 to the reading position 551S of the color detection sensor 551, the length of the sheet 110 in the conveying direction is shorter than the predetermined length.

Further, in the image forming apparatus 1 according to this embodiment, the output ICC profile is generated based on the result of reading the test image, but there may be adopted a configuration in which, for example, a tone correction table for converting the image data is generated. The tone correction table is a one-dimensional look-up table for converting an input value of the image signal of the image data into an output value in order to correct the tone characteristic of the image to be formed onto the sheet 110 to an ideal tone characteristic. When this configuration is adopted, the printer controller 103 determines the tone characteristic based on the result of reading the test image by the color detection sensor 551 of the automatic reading apparatus 400, and generates the tone correction table so that the tone characteristic becomes an ideal tone characteristic. The image forming apparatus 1 forms an image onto the sheet 110 based on the image data converted based on the tone correction table.

Even when the tone correction table is generated, the number of patch images required for the initial correction is larger than the number of patch images required for the interruption correction. In view of this, when the chart for initial correction is to be printed onto the A3 size sheet 110, the test image is arranged onto the sheet 110 so that the trailing edge of the sheet 110 having the chart for initial correction printed thereon remains in the through-path 731. Meanwhile, when the chart for interruption correction is to be printed onto the A3 size sheet 110, the test image is arranged onto the sheet 110 so that the trailing edge of the sheet 110 having the chart for interruption correction printed thereon does not remain in the through-path 731. Further, the stop position of the sheet 110 having the chart for initial correction printed thereon is on the upstream in the conveying direction with respect to the stop position of the sheet 110 having the chart for interruption correction printed thereon. The test image (patch images) of the chart for initial correction is different from the test image (patch images) of the chart for interruption correction.

The output ICC profile and the tone correction table are both a conversion condition for converting the image data. The image forming apparatus 1 is configured to form an image onto the sheet 110 based on image data converted based on the conversion condition. Further, the output ICC profile and the tone correction table are both included in the image forming condition for use to form an image onto the sheet by the image forming apparatus 1.

In the image forming apparatus 1 according to this embodiment described above, in the initial correction, the conveyance of the sheet 110 is stopped at a position at which the trailing edge of the sheet 110 remains in the through-path 431, thereby being capable of reading the test image in the entire range from the leading edge of the sheet 110. In this manner, the number of sheets 110 required at the time of the initial correction can be reduced. At the time of the interruption correction, the conveyance of the sheet 110 is stopped at a position at which the trailing edge of the sheet 110 does not remain in the through-path 431, and hence the conveyance of the next sheet through the through-path 431 is allowed. In this manner, the reduction in productivity at the time of the interruption correction can be suppressed. As described above, the image forming apparatus 1 according to this embodiment is capable of achieving both of reduction in number of sheets at the time of the initial correction and improvement in productivity at the time of the interruption correction while ensuring the color reproducibility and maintaining the image quality. Further, the image forming apparatus 1 according to this embodiment is capable of stopping the sheet at a stop position suitable for control of reading the test image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-059907, filed Mar. 30, 2020, which is hereby incorporated by reference herein in its entirety.

What is claimed is:

1. An image forming apparatus comprising:
   an image forming unit configured to form an image onto a sheet based on an image forming condition;
   a conveyance roller configured to convey the sheet in a first conveyance path;
   a sheet discharger configured to discharge the sheet conveyed in the first conveyance path;
   a sensor configured to read, in a second conveyance path branched from the first conveyance path, a test image formed on the sheet;
   a tray on which the sheet is discharged via the second conveyance path;
   a controller configured to:
     generate the image forming condition based on a reading result of the sensor;
     execute first control of controlling the image forming unit to form a first test image, controlling the conveyance roller to stop the sheet having the first test image formed thereon at a first stop position, and starting reading of the first test image by the sensor; and
     execute second control of controlling the image forming unit to form a second test image, controlling the conveyance roller to stop the sheet having the second test image formed thereon at a second stop position, and starting reading of the second test image by the sensor,
   wherein the first control is executed before the image forming unit forms an image based on a job,
   wherein the second control is executed while the image forming unit successively forms images onto a plurality of sheets based on the job,
   wherein, when the first test image is formed on a predetermined size of sheet, a trailing edge of the predetermined size of sheet stopped at the first stop position is located upstream of a position in which the second conveyance path is branched from the first conveyance path, and
   wherein, when the second test image is formed on the predetermined size of sheet, the trailing edge of the predetermined size of sheet stopped at the second stop position is located downstream of the position in which the second conveyance path is branched from the first conveyance path.

2. The image forming apparatus according to claim 1, wherein the controller is configured to:
   stop, when a length of the sheet in a conveying direction is equal to or longer than a predetermined length, in a case in which the first control is performed, conveyance of the sheet at a position at which a trailing edge of the sheet in the conveying direction remains in the first conveyance path, and stop, in a case in which the second control is performed, the conveyance of the sheet at a position at which the trailing edge of the sheet in the conveying direction does not remain in the first conveyance path; and
   stop, when the length of the sheet in the conveying direction is shorter than the predetermined length, in both of the case in which the first control is performed and the case in which the second control is performed, the conveyance of the sheet at a position at which the trailing edge of the sheet in the conveying direction is retracted from the first conveyance path.

3. The image forming apparatus according to claim 2, wherein the predetermined length is determined based on a distance from a branch point between the first conveyance path and the second conveyance path to a reading position of the sensor.

4. The image forming apparatus according to claim 1, wherein the controller is configured to stop, when a leading edge of the sheet in a conveying direction passes through a reading position of the sensor, conveyance of the sheet to control the sensor to start the reading of the image.

5. The image forming apparatus according to claim 1, further comprising, in the second conveyance path, a sheet detector configured to detect the conveyed sheet,
   wherein the controller is configured to convey, in a case in which the first control is performed, when the sheet detector detects the sheet, the sheet by a distance corresponding to a distance from a detecting position of the sheet detector to a reading position of the sensor and to a distance from a leading edge of the sheet in a conveying direction to a front image formed on the sheet, and then stop the conveyance of the sheet.

6. The image forming apparatus according to claim 5, wherein the image forming unit is configured to form, as the test image, a predetermined number of patch images in each of a row direction and a column direction of the sheet, and
   wherein the controller is configured to convey the sheet by a distance corresponding to the distance from the detecting position of the sheet detector to the reading position of the sensor and to a distance from the leading edge of the sheet in the conveying direction to a patch image in a first row formed on the sheet, and then stop the conveyance of the sheet.

7. The image forming apparatus according to claim 6, wherein the image forming unit is configured to set a distance from the leading edge of the sheet in the conveying direction to a patch image in a first row of an image formed onto the sheet when the second control is performed to be longer than a distance from the leading edge of the sheet in the conveying direction to a patch image in a first row of an image formed onto the sheet when the first control is performed.

8. The image forming apparatus according to claim 6, wherein the sensor is configured to read patch images formed on the sheet by each row while moving in a direction orthogonal to the conveying direction of the sheet.

9. The image forming apparatus according to claim 8, wherein the controller is configured to:
convey, when the reading of one row of patch images by the sensor is finished, the sheet until a next row of patch images reach the reading position of the sensor;
stop the conveyance of the sheet when the next row of patch images reaches the reading position of the sensor; and
control the sensor to read the next row of patch images.

10. The image forming apparatus according to claim 8, wherein the sensor is configured to read the patch images by each row formed on the sheet while reciprocating in the direction orthogonal to the conveying direction of the sheet.

11. The image forming apparatus according to claim 1, further comprising a pulse motor for use to convey the sheet,
wherein the controller is configured to count a number of pulses of the pulse motor to stop the sheet at a predetermined position.

12. The image forming apparatus according to claim 1, wherein the image forming unit is configured to perform, in a case in which the second control is performed, image formation processing corresponding to the job after forming an image for use in the second control onto the sheet.

13. An image forming apparatus comprising:
an image forming unit configured to form an image onto a sheet based on an image forming condition;
a first conveyance path in which the sheet is conveyed to the discharge tray;
a second conveyance path branched from the first conveyance path;
a sensor, which is arranged on the second conveyance path, configured to read a test image on the sheet, wherein the sensor is configured to read the test image while moving in a direction which intersects a conveyance direction in which the sheet is conveyed;
a controller configured to:
control the image forming unit to form the test image on the sheet; and
generate the image forming condition based on a reading result of the test image obtained by the sensor,
wherein the controller is configured to perform:
(i) a first mode in which reading of the test image on the first sheet is started in a state where the first sheet on which the first test image has been formed is straddling the first conveyance path and the second conveyance path; and
(ii) a second mode in which reading of a second test image on a second sheet is started in a state where the second sheet is conveyed such that a trailing edge of the second sheet on which the second test image has been formed is located on the second conveyance path.

14. The image forming apparatus according to claim 13, wherein the controller is configured to control the sensor to read, with the sheet on which the test image has been formed intermittently stopped, the test image.

15. The image forming apparatus according to claim 13, wherein the image forming unit comprises a fixing unit configured to fix the image formed on the sheet, and
wherein the first conveyance path and the second conveyance path are arranged on the downstream side of the fixing unit.

16. The image forming apparatus according to claim 13, a length of the first sheet in the conveyance direction is longer than a predetermined length, and
a length of the second sheet in the conveyance direction is longer than the predetermined length.

17. The image forming apparatus according to claim 13, wherein the controller comprises an image processor configured to perform image processing on image data,
wherein the image forming unit is configured to form the image based on the image data to which the image processing has been performed, and
wherein the image forming condition is a tone correction condition which is used in the image processing.

18. The image forming apparatus according to claim 13, wherein the controller comprises an image processor configured to perform image processing on image data,
wherein the image forming unit is configured to form the image based on the image data to which the image processing has been performed, and
wherein the image forming condition is a color profile which is used in the image processing.

* * * * *